United States Patent
Weyl et al.

(10) Patent No.: US 8,833,323 B2
(45) Date of Patent: Sep. 16, 2014

(54) IGNITION LASER

(75) Inventors: Helmut Weyl, Wiesbaden (DE); Marco Gueth, Ludwigsburg (DE); Werner Herden, Gerlingen (DE); Karl-Heinz Nuebel, Simmozheim (DE); Franz Wetzl, Mundelsheim (DE); Martin Weinrotter, Stuttgart-Botnang (DE); Pascal Woerner, Stuttgart (DE); Stefan Henneck, Leonberg (DE); Juergen Raimann, Weil der Stadt (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 641 days.

(21) Appl. No.: 13/147,330

(22) PCT Filed: Jan. 25, 2010

(86) PCT No.: PCT/EP2010/050795
§ 371 (c)(1),
(2), (4) Date: Oct. 12, 2011

(87) PCT Pub. No.: WO2010/086287
PCT Pub. Date: Aug. 5, 2010

(65) Prior Publication Data
US 2012/0024250 A1    Feb. 2, 2012

(30) Foreign Application Priority Data

Feb. 2, 2009 (DE) .......................... 10 2009 000 540
Jan. 25, 2010 (DE) .......................... 10 2010 001 185

(51) Int. Cl.
*F02P 23/04*    (2006.01)
*F02C 7/264*    (2006.01)
*H01S 3/02*    (2006.01)
*H01S 3/00*    (2006.01)
*H01S 3/113*    (2006.01)

(52) U.S. Cl.
CPC ................. *F02P 23/04* (2013.01); *H01S 3/025* (2013.01); *H01S 3/005* (2013.01); *H01S 3/113* (2013.01); *F02C 7/264* (2013.01)
USPC ...................................................... 123/143 B

(58) Field of Classification Search
CPC ....................................................... F02P 23/04
USPC .......................... 123/143 R, 143 B; 29/592.1
See application file for complete search history.

(56) References Cited

U.S. PATENT DOCUMENTS 4,434,753 A * 3/1984 Mukainakano et al. .. 123/143 B
4,523,552 A * 6/1985 Mukainakano et al. .. 123/143 B (Continued)

FOREIGN PATENT DOCUMENTS

DE      101 45 944       4/2003
DE   10 2005 043963      4/2006

(Continued)

OTHER PUBLICATIONS

International Search Report for PCT/EP2010/050795, dated Apr. 30, 2010.

*Primary Examiner* — Thomas Moulis
(74) *Attorney, Agent, or Firm* — Kenyon & Kenyon LLP

(57) ABSTRACT

An ignition laser, includes a laser-active solid-state body, a housing and a combustion chamber window, the housing having an inner sleeve and an outer sleeve. An insert is provided between the inner sleeve and the outer sleeve, the insert and the combustion chamber window being joined sealingly and integrally.

15 Claims, 4 Drawing Sheets

(56) References Cited

U.S. PATENT DOCUMENTS

| | | | |
|---|---|---|---|
| 5,367,869 A | 11/1994 | DeFreitas | |
| 8,322,320 B2* | 12/2012 | Oledzki | 123/143 B |
| 8,607,755 B2* | 12/2013 | Weinrotter et al. | 123/143 B |
| 8,701,612 B2* | 4/2014 | Gruber | 123/143 B |
| 2010/0275867 A1* | 11/2010 | Weinrotter et al. | 123/143 B |
| 2011/0185996 A1* | 8/2011 | Kraus et al. | 123/143 B |
| 2011/0259292 A1* | 10/2011 | Woerner et al. | 123/143 B |
| 2012/0024251 A1* | 2/2012 | Weinrotter et al. | 123/143 B |
| 2012/0037108 A1* | 2/2012 | Herden et al. | 123/143 B |

FOREIGN PATENT DOCUMENTS

| | | |
|---|---|---|
| EP | 1 519 038 | 3/2005 |
| WO | WO 2009/027145 | 3/2009 |
| WO | WO 2009/097635 | 8/2009 |
| WO | WO 2010/015500 | 2/2010 |

* cited by examiner

IGNITION LASER

FIELD OF THE INVENTION

The present invention relates to an ignition laser.

BACKGROUND INFORMATION

WO 2005/066488 describes a so-called laser ignition. This laser ignition includes an ignition laser protruding into the combustion chamber of an internal combustion engine. This ignition laser is connected via a light guide device to a pumped light source.

A so-called combustion chamber window, which is transmissive for the laser pulses generated in the ignition laser, is present on one end of the ignition laser facing the combustion chamber. The laser wavelength is between 500 nm and 1500 nm, preferably between 900 nm and 1100 nm. This combustion chamber window must be accommodated in a housing of the ignition laser with a seal. High demands are made of the seal between the combustion chamber window and the housing because surface temperatures of more than 600° C. may occur on the combustion chamber window during operation in an internal combustion engine, for example. In addition, intermittent pressure loads of more than 250 bar also occur. When an ignition laser is used to ignite a gas turbine, lower pressures prevail in the combustion chamber of the gas turbine but the surface of the combustion chamber window may reach temperatures of up to 1000° C.

It is apparent that the interior of the ignition laser must be sealed with respect to the extremely high temperatures and pressures prevailing in the combustion chamber. In other words, if exhaust gases went from the combustion chamber into the interior of the ignition laser, this would lead to failure of the ignition laser.

SUMMARY

Example embodiments of the present invention provide an ignition laser with which the combustion chamber window is sealed with respect to an interior of the ignition laser such that the longest possible operating life of the ignition laser with a safe and reliable seal is ensured.

With an ignition laser including a laser-active solid-state body, a housing having an inner sleeve and an outer sleeve and a combustion chamber window, an insert is provided between the inner sleeve and the outer sleeve, the insert and the combustion chamber window being joined sealingly and integrally.

Important features are also shown in the following description and in the drawing where the features may be important either alone or in various combinations without explicit reference thereto in each case.

Through the insert, the requirements of the housing are reduced, so that simplified manufacturing procedures and less expensive materials may be used. The inner sleeve and outer sleeve may be manufactured from a metal such as steel, which is inexpensive to acquire. The housing must have adequate thermal strength and the required mechanical strength.

On the other hand, the insert may be manufactured from a different material than the housing, so that sealing of the combustion chamber window is simplified. This makes the ignition laser less expensive and more reliable during operation.

It is particularly advantageous if the insert is manufactured from a ceramic, in particular $Al_2O_3$ (aluminum oxide) having a glass additive. $Al_2O_3$ or modifications of $Al_2O_3$ or mixtures containing $Al_2O_3$ have already in the past proven to be materials having thermal resistance and pressure resistance. For example, this material has been used successfully for several decades to manufacture traditional spark plugs.

A sealing connection which will withstand the pressures and temperatures occurring during operation of the internal combustion engine may be implemented in a safe process between the insert made of ceramic and the combustion chamber window.

The insert and the combustion chamber window preferably have thermal expansion coefficients as similar as possible. Therefore the thermal stresses are reduced and consequently the durability and reliability of the integral joint between the insert and the combustion chamber window are increased.

The material of the insert and the material of the combustion chamber window in particular preferably have thermal expansion coefficients largely corresponding to one another, for example, not differing by more than 20% and/or by no more than $2*10^{-6}$/K in the temperature range between 25° C. and 400° C. This ensures good thermal and thermomechanical stability of the joining partners during the production and operation of the ignition laser.

Additionally, the combustion chamber window should have the required transmissive properties with the lowest possible losses for the wavelength of the laser pulses. Different materials are suitable for this purpose. For example, the combustion chamber window may be manufactured from an $Al_2O_3$ single crystal (sapphire), an $MgAl_2O_4$ single crystal (spinel) or aluminum oxynitride (ALON™), also known as "transparent aluminum").

The combustion chamber window may have almost any shape. However, a square or circular pane is preferred. When using the circular pane, material usage of the relatively more expensive material is advantageously lower. In designing the combustion chamber window, it should be taken into account that the optical aperture is as large as possible because this would definitely improve the focusing properties for generating a laser plasma at the ignition point.

Furthermore, it is provided that the combustion chamber window is sealingly and integrally joined to an end face of the insert, or the combustion chamber window is inserted into a recess in the insert and sealingly and integrally joined. The arrangement of the insert with the recess allows more options for joining the two parts because in addition to the connection to the end face of the insert, the combustion chamber window may also be joined radially. In any case, through suitable joining techniques, it is necessary to ensure that the insert forms an airtight and thermally resistant unit after being joined with the combustion chamber window.

If there is a radial connection between the insert and the combustion chamber window, then a particularly high correlation of the thermal expansion coefficients of the joining partners is important. In this case, joining partners whose thermal expansion coefficients do not differ by more than 15% in the temperature range between 25° C. and 400° C. and/or differ by no more than $1*10^{-6}$/K are preferred, such as sapphire and $Al_2O_3$ containing a glass phase component.

The tightness may be increased if the combustion chamber window is additionally pressed by the outer sleeve against the insert.

For connecting the insert to the combustion chamber window it is possible, for example, to connect the combustion chamber window to the insert on at least one contact surface by hard soldering, sintering, garnishing and subsequent sintering or diffusion welding. For example, during hard soldering, a titanium-activated solder is usually used. During sintering, a flux agent may already be contained in the material of the insert or blanks of the insert and the combustion chamber window are brought together in an unfired state (so-called garnishing) and subsequently sintered. During diffusion welding the contact surfaces of the insert and combustion chamber window are polished and subsequently pressed together, for example, by the outer sleeve of the housing.

Particularly preferred manufacturing methods for the ignition laser provide that the insert and the combustion chamber window are integrally joined by a soldering operation.

In a first variant, the use of a solder whose main ingredients are silver and copper is provided. The use of such a solder ensures that thermomechanical stresses between the joining partners may be plastically absorbed in the solder.

In addition, it is preferably provided that the solder is an active solder, i.e., a solder which ensures wetting of the joining partners. To this end the solder preferably contains 1 wt %-10 wt % titanium.

In solders whose main ingredients were silver and copper plus titanium in the amount of 2 wt %-4 wt %, very good results may be obtained in endurance tests with regard to tightness and the thermomechanical load-bearing capacity of the joints.

It is provided that the solder material is punched out of a film using a punching device and inserted at the joining site between the insert and the combustion chamber window. The soldering is subsequently performed in vacuo in a special centering device which secures the joining partners in relation to one another.

Alternatively, in a second variant the use of a glass solder is provided. The glass solder is preferably an alkali-alkaline earth-borosilicate glass, in particular an alkali-alkaline earth-borosilicate glass containing at least one element oxide, for example, $Al_2O_3$.

The material of the glass solder is preferably selected such that its thermal expansion coefficient is in the range between the thermal expansion coefficients of the joining partners.

The material of the glass solder is also preferably selected such that its glass transition temperature is at least 50K higher than the maximum use temperature of the ignition laser, i.e., is at least 650° C., for example. Moreover, the material of the glass solder is preferably selected such that it is chemically resistant to exhaust gases even at high temperatures, for example, at 600° C.

The glass solder is preferably manufactured by processing glass powder with an organic binder or an organic binder system to form a paste. This paste is subsequently applied to at least one of the joining partners by screen printing or dispensing, for example.

The method steps of heating the organic constituents and sintering of the glass particles are preferably performed next.

The actual soldering is preferably performed at a higher temperature than the heating and sintering. Soldering is preferably performed at a temperature above the hemisphere temperature of the material of the selected glass solder.

Exemplary embodiments of the present invention are explained in detail below as examples on the basis of the figures.

DETAILED DESCRIPTION

On the basis of the figures, the ignition device according to an example embodiment of the present invention is explained in an internal combustion engine as an example. However, the ignition laser may also be implemented in a gas turbine.

Figure 1A:
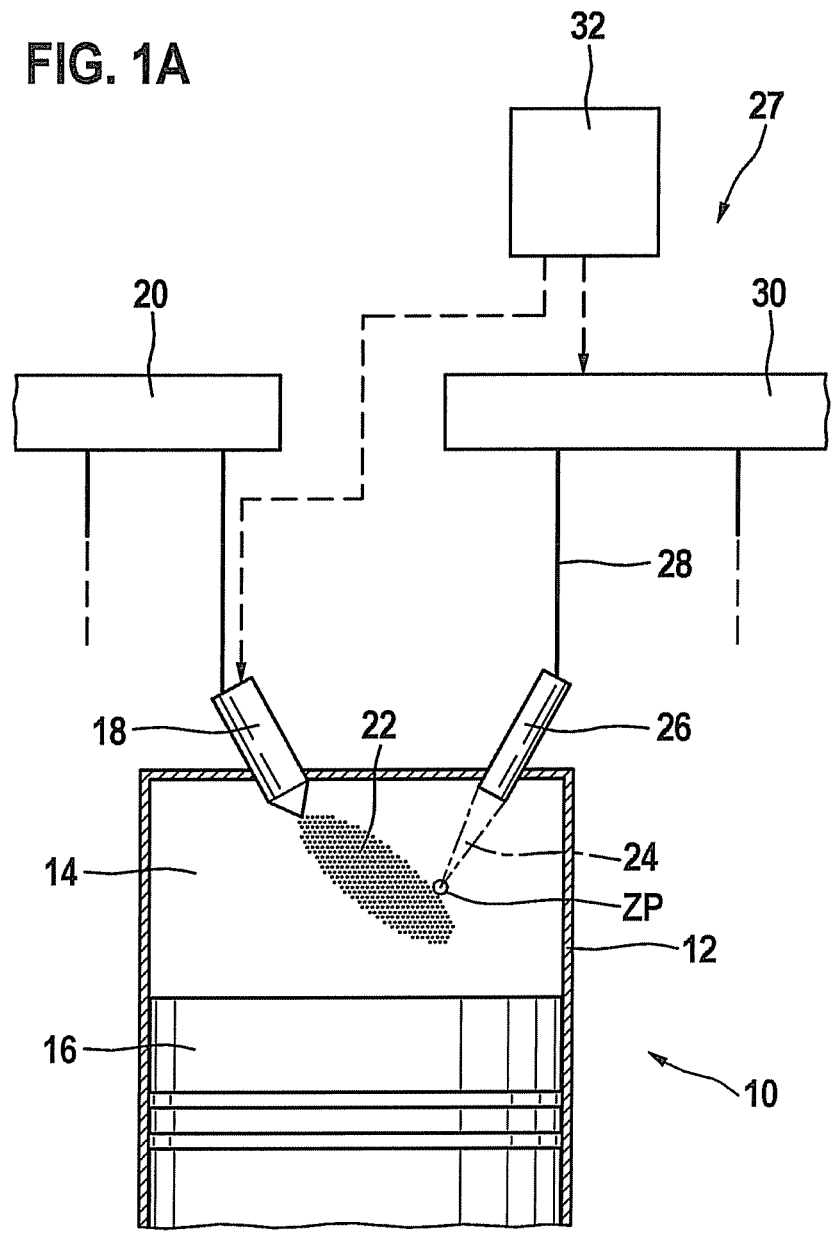
FIG. 1a shows a schematic diagram of a laser-based ignition device in an internal combustion engine.

An internal combustion engine is labeled on the whole with reference numeral 10 in FIG. 1a. It may be used to drive a motor vehicle (not shown). Internal combustion engine 10 usually includes a plurality of cylinders, only one being labeled with reference numeral 12 in FIG. 1a. A combustion chamber 14 of cylinder 12 is bordered by a piston 16. Fuel enters combustion chamber 14 through an injector 18, which is connected to a pressurized fuel storage 20, known as a rail. Alternatively, the fuel-air mixture may also be formed outside of combustion chamber 14, for example, in the intake manifold.

Fuel-air mixture 22 present in combustion chamber 14 is ignited by a laser pulse 24, which is emitted by an ignition device 27 including an ignition laser 26 into combustion chamber 14. For this purpose, ignition laser 26 is supplied with pumped light via a light guide device 28, this pumped light being supplied by a pumped light source 30. Pumped light source 30 is controlled by a control unit 32, which also triggers injector 18.

Figure 1B:
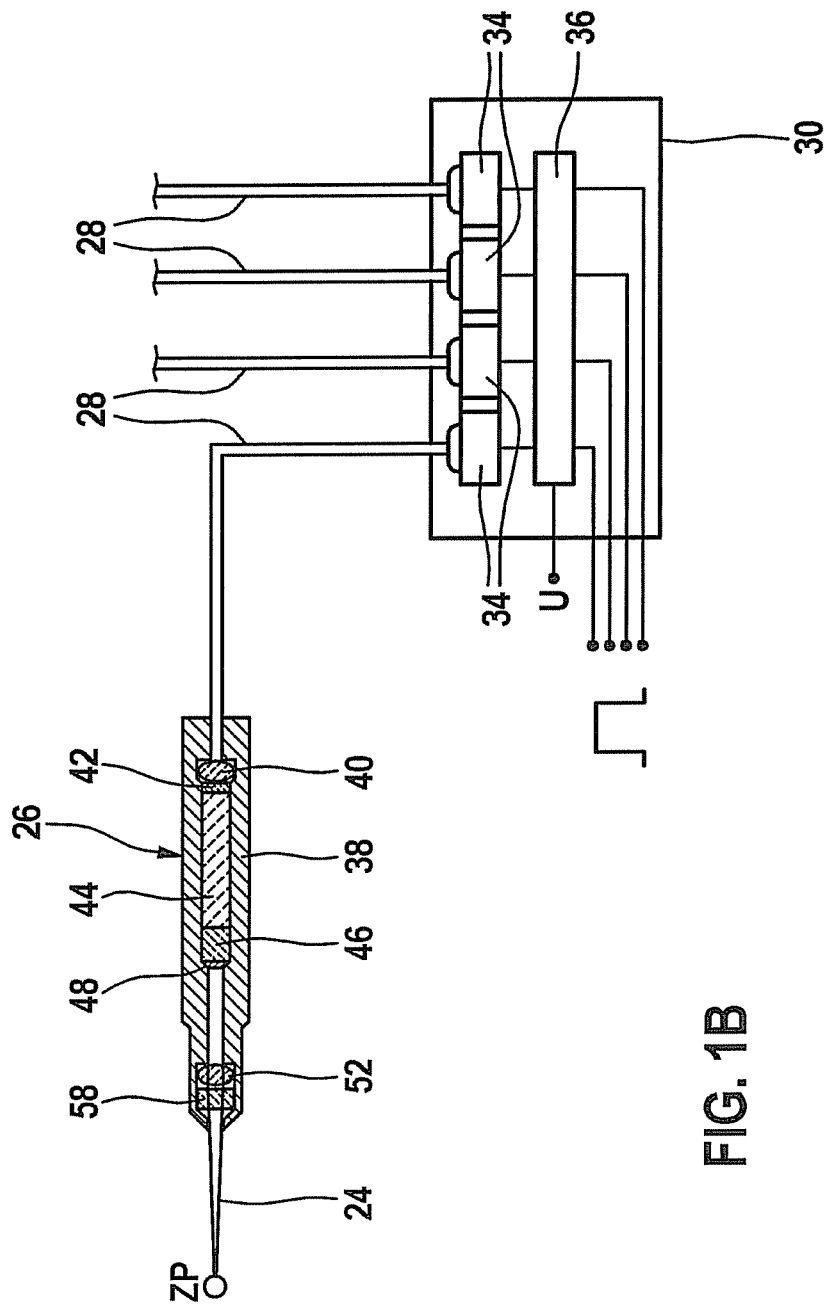
FIG. 1b shows a schematic and detailed diagram of the ignition device from FIG. 1.

As FIG. 1b shows, pumped light source 30 supplies a plurality of light guide devices 28 for various ignition lasers 26, each being assigned to a cylinder 12 of internal combustion engine 10. For this purpose, pumped light source 30 has a plurality of individual laser light sources 34, which are connected to a pulsed current supply 36. Due to the presence of the plurality of individual laser light sources 34, a "latent" distribution of pumped light to various laser devices 26 is implemented, so that no optical distributors or the like are necessary between pumped light source 30 and ignition lasers 26.

Ignition laser 26 has a laser-active solid-state body 44 having a passive quality circuit 46, which together with an input mirror 42 and an output mirror 48 forms an optical resonator. By applying pumped light generated by pumped light source 30, ignition laser 26 generates in a substantially known manner a laser pulse 24, which is focused through a focusing lens 52 on an ignition point ZP located in combustion chamber 14 (FIG. 1a). The components present in housing 38 of ignition laser 26 are separated from combustion chamber 14 by a pane-shaped combustion chamber window 58. Combustion chamber window 58 may be arranged to be square or preferably round.

Figure 2:
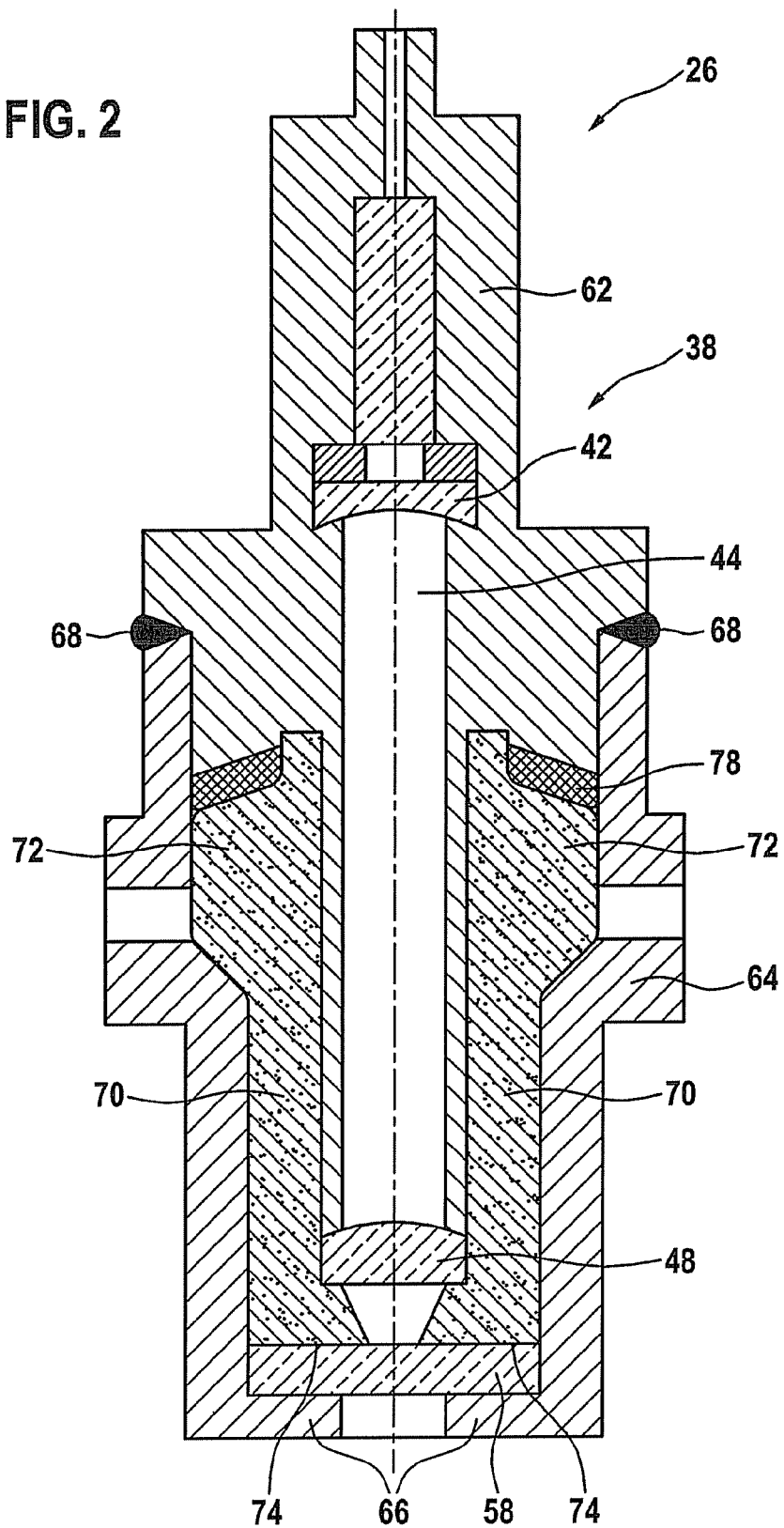
FIGS. 2 and 3 show two exemplary embodiments of an ignition laser from FIG. 1 or FIG. 2.
Figure 3:
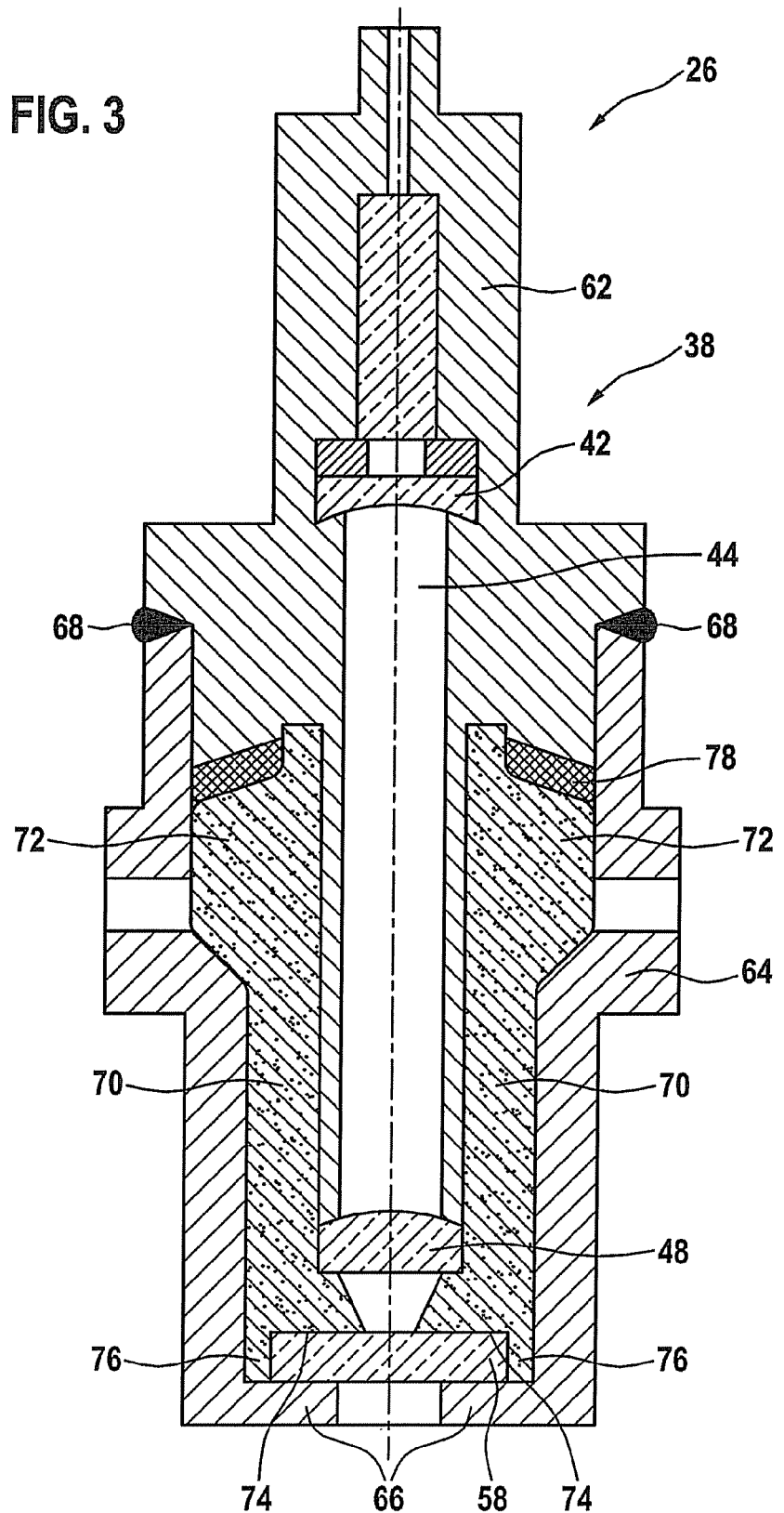

FIGS. 2 and 3 show two exemplary embodiments of ignition laser 26. In both exemplary embodiments, housing 38 has a two-part configuration. It includes an inner sleeve 62 and an outer sleeve 64. Inner sleeve 62 surrounds laser-active solid-state body 44. Outer sleeve 64 has a shoulder 66 on an end facing combustion chamber 14 (see FIG. 1a). Inner sleeve 62 and outer sleeve 64 are connected to one another by a radial weld 68. Inner sleeve 62 and outer sleeve 64 may be welded together, such that shoulder 66 presses combustion chamber window 58 against an insert 70.

An insert 70, preferably manufactured of a ceramic material, is situated between inner sleeve 62 and outer sleeve 64. Insert 70 has a thickening 72 opposite a laser beam exit direction. Thickening 72 ensures reliable fixation of insert 70 in outer sleeve 64.

In the exemplary embodiment shown here, the focusing lens is integrated into output mirror 48. Insert 70 has a planar and ring-shaped contact surface 74. One side of combustion chamber window 58 is in contact with contact surface 74. A shoulder 66 of outer sleeve 64 is in contact with the opposite side of combustion chamber window 58. Shoulder 66 is configured such that it has an opening at the center through which the laser pulses of ignition laser 26 are able to pass unhindered.

Insert 70 and combustion chamber window 58 are joined sealingly on ring-shaped contact surface 74. For this purpose, one of the joining methods mentioned in the introduction to the description may be used. Alternatively or cumulatively, it is also possible to press insert 70 and combustion chamber window 58 together. For this purpose, a ring 78 is provided between insert 70 and inner sleeve 62, this ring being arranged to be resilient in the axial direction and providing the required pressing force between insert 70 and combustion chamber window 58.

FIG. 3 differs from FIG. 2 only in the embodiment of insert 70 and the bearing support of combustion chamber window 58. Combustion chamber window 58 in FIG. 3 is additionally guided radially and laterally by a frame 76 of insert 70, so that combustion chamber window 58 may also be joined radially to insert 70 in the area of insert 70 on contact surface 74. Preferably circular panes are used in this example embodiment. Square panes are also possible here in general.

To ensure the required long operating life of ignition laser 26 and a secure seal of combustion chamber window 58 with insert 70 for reliable operation, the choice of the material of combustion chamber window 58 and of insert 70 and the joining technique for joining the two parts are of crucial importance.

The material of combustion chamber window 58 must be transmissive for the wavelength of the emitted laser beams (between 500 nm and 1500 nm, preferably between 900 nm and 1100 nm) and should have a thermal expansion coefficient as similar as possible to that of insert 70 in order to prevent thermal stresses. Furthermore, both materials must be heat-resistant because temperatures up to 1000° C. may occur during operation of the ignition laser. A suitable material for the insert is $Al_2O_3$ (aluminum oxide) or modifications of $Al_2O_3$ or mixtures containing $Al_2O_3$, in particular containing glass additives. In the past, these have proven to be both temperature-resistant and pressure-resistant materials in conventional spark plugs, for example. The aforementioned conditions of combustion chamber window 58 are met, for example, by an $Al_2O_3$ single crystal (sapphire), an $MgAl_2O_4$ single crystal (spinel) or aluminum oxynitride (ALON™, also known as "transparent aluminum").

Various joining techniques are possible for connecting combustion chamber window 58 to insert 70. The connection may be established by hard soldering using a titanium-activated solder, for example. A silver-copper solder containing 3.5 wt % titanium, for example, is used for this purpose. Suitable pieces are punched out of a film made of this material and placed on contact surface 74 between insert 70 and combustion chamber window 58. The soldering is subsequently performed in vacuo in a special centering device, which secures the joining partners in relation to one another.

Alternatively, it is also possible to use a glass solder, for example, an alkali-alkaline earth-borosilicate glass containing $Al_2O_3$. This glass solder is manufactured by processing glass powder with an organic binder system to form a paste. This paste is subsequently applied by screen printing to combustion chamber window 58. After that, the organic components are heated out and the glass particles are sintered. The actual soldering subsequently takes place at a temperature above the hemisphere temperature of the glass solder.

In endurance tests of ignition lasers 26, in which such a glass solder is used to connect insert 70 to combustion chamber window 58 in the manner described, very good results may consistently be achieved with respect to the tightness and the thermomechanical load-bearing capacity of the joints.

In the variant shown in FIG. 2, there is an axial connection of joining partners 70, 58 at contact surface 74. In the variant shown in FIG. 3, instead of or in addition to the axial connection, there is a radial connection between combustion chamber window 58 and frame 76 of insert 70.

Joining of the two parts by sintering is also possible, in which case a flux agent may also be contained in the material of insert 70. Both materials may also be brought together in an unfired ("green") condition (so-called garnishing) and are subsequently sintered.

Diffusion welding is also possible, in which the contact surfaces are highly polished and subsequently pressed together, for example, by shoulder 66 on outer sleeve 64. It should be pointed out that in a configuration which offers more than one joining surface between combustion chamber window 58 and insert 70 (as shown in FIG. 3), each joining surface may be joined by a different joining technique, so that a plurality of methods may be employed.

What is claimed is:

1. An ignition laser, comprising:
   a laser-active solid-state body;
   a housing; and
   a combustion chamber window;
   wherein the housing includes an inner sleeve and an outer sleeve; and
   wherein an insert is provided between the inner sleeve and the outer sleeve, the insert and the combustion chamber window being joined sealingly and integrally.

2. The ignition laser according to claim 1, wherein the insert is made of a ceramic material.

3. The ignition laser according to claim 1, wherein the insert is formed of at least one of (a) $Al_2O_3$ and (b) $Al_2O_3$ including a glass additive.

4. The ignition laser according to claim 1, wherein a material of the insert has a thermal expansion coefficient which corresponds largely to a thermal expansion coefficient of a material of the combustion chamber window.

5. The ignition laser according to claim 4, wherein the combustion chamber window is formed of an $Al_2O_3$ single crystal.

6. The ignition laser according to claim 4, wherein the combustion chamber window is formed of an $MgAl_2O_4$ single crystal.

7. The ignition laser according to claim 4, wherein the combustion chamber window is formed of an aluminum oxynitride.

8. The ignition laser according to claim 1, wherein the combustion chamber window is at least one of (a) a rectangular pane and (b) a quadratic pane.

9. The ignition laser according to claim 1, wherein the combustion chamber window is at least one of (a) a round pane and (b) a circular pane.

10. The ignition laser according to claim 1, wherein the combustion chamber window is joined sealingly and integrally to an end face of the insert.

11. The ignition laser according to claim 1, wherein the combustion chamber window is arranged in a recess in the insert and is joined sealingly and integrally.

12. The ignition laser according to claim 1, wherein the combustion chamber window is connected to the insert on at least one contact surface by at least one of (a) hard soldering, (b) sintering, (c) garnishing and subsequent sintering and (d) diffusion welding.

13. A laser ignition device, comprising:
   a control unit;
   an ignition laser according to claim 1; and
   a light guide device suppliable with pumped light from a pumped light source.

14. A method for manufacturing an ignition laser as recited in claim 1, comprising:
   connecting the insert to the combustion chamber window by soldering.

15. The method according to claim 14, wherein the soldering is performed with a solder including at least one of (a) an active solder, (b) an active solder based on Ag—Cu having a titanium content, (c) a glass solder, and (d) an alkali-alkaline earth-borosilicate glass having an $Al_2O_3$ content.

\* \* \* \* \*